June 6, 1939.    T. H. SCHOEPF ET AL    2,161,684
MAGNETIC TRACK BRAKE
Filed Jan. 14, 1935
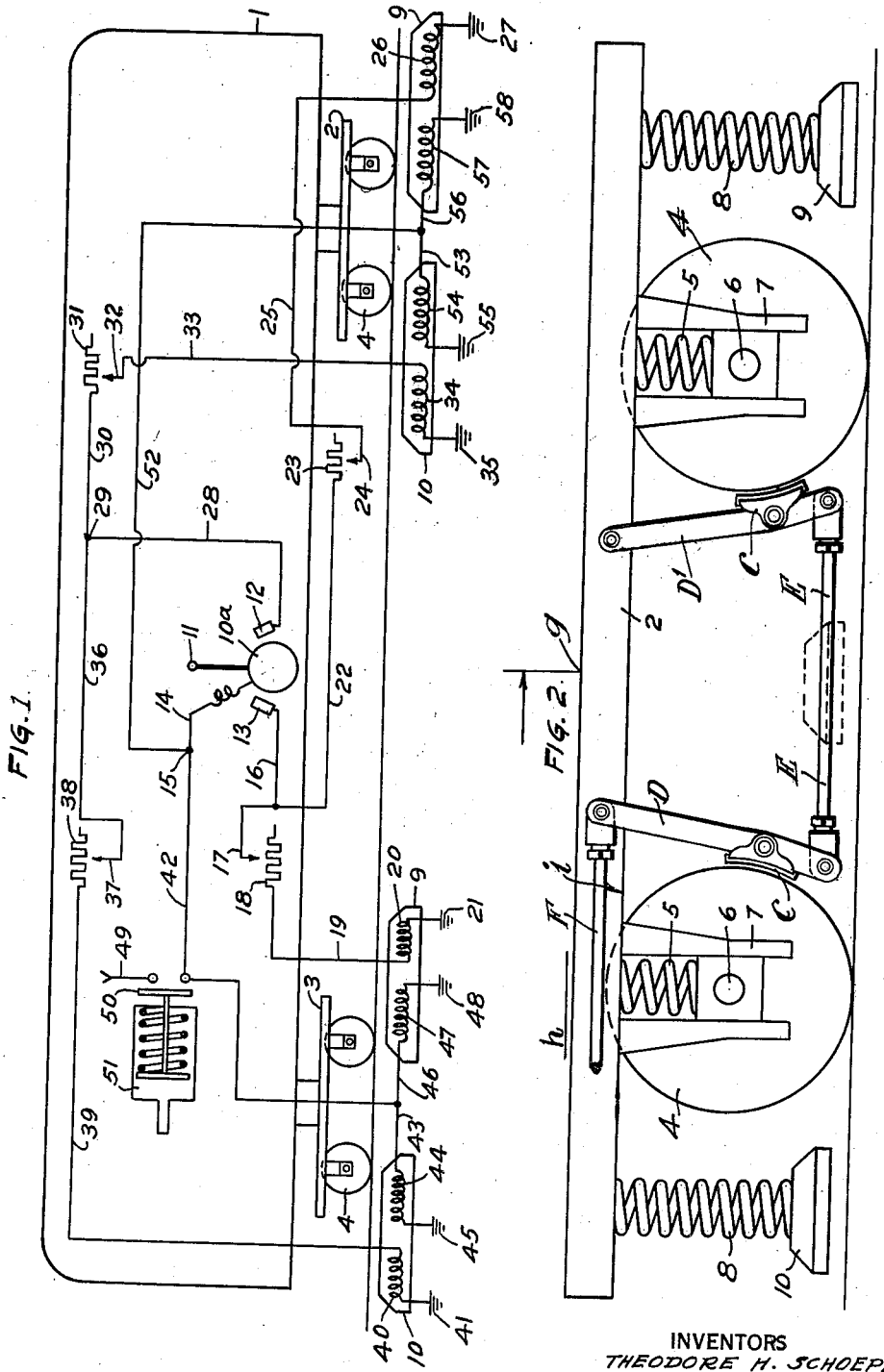
INVENTORS
THEODORE H. SCHOEPF,
DAVID M. RITCHIE.
BY
ATTORNEYS.

Patented June 6, 1939

2,161,684

UNITED STATES PATENT OFFICE 2,161,684

MAGNETIC TRACK BRAKE

Theodore H. Schoepf and David M. Ritchie, Cincinnati, Ohio, assignors to The Cincinnati Traction Building Co., Cincinnati, Ohio, a corporation of Ohio Application January 14, 1935, Serial No. 1,602

14 Claims. (Cl. 188—165)

Our invention relates to magnetic track brakes and a method of applying such brakes.

The object of our invention is to provide a magnetic track brake system, wherein the energization of the respective track brake shoes is variable and wherein the shoes are so located, proportioned and controlled as to be normally energized upon wheel brake application, and certain of them further, or abnormally, energized during deceleration through operation of momentum responsive or inertia responsive means to properly apply counterbalancing downward forces in order to uniformly distribute downward forces between the respective axles and their wheels. This counteracts unequal distribution of downward forces due to the action of the force of momentum during deceleration to destroy static uniformity of weight distribution in a decelerating vehicle. Where equal forces are applied downwardly to the respective axles, the traction between the respective wheels and the rails will be substantially uniform, and the braking effect of the respective wheel brakes, which is dependent upon this traction, will likewise be substantially uniform. Locking and skidding, or sliding, of the rearmost wheels (due to destruction of wheel traction which is proportional to the downward force applied upon a given wheel) are thus prevented by maintaining uniform distribution of downward forces applied to the respective axles during deceleration of a vehicle.

It is an object to provide outrigger magnetic brake shoes so arranged that the energization of each shoe may be regulated and so arranged that the trailing shoe is automatically given the greater energization whereby to exert between truck and rail a force greater than that exerted by a forward shoe.

A moving body has kinetic energy stored therein by virtue of its motion. To absorb that energy and bring the body to rest at a uniform rate of deceleration, $a$, requires a force $f$ so that we have the formula:

$$f = ma = \frac{w}{g} \times a$$

that is, $f$ (force) $= ma$ (mass deceleration) or $$\frac{w}{g}$$

(weight divided by gravity) $\times$ (times) $a$ (deceleration).

The application of the force $f$ to the rims of the wheels in railway vehicles results in a transfer of a part of the weight of the body from the trailing truck to the leading truck; and in the case of each truck a transfer from the trailing axle to the leading axle.

Therefore, when computing the proportions of the wheel braking, the total weight of the vehicle, body and trucks is assumed to be equally distributed between all the axles. 85 per cent thereof is effective for braking. This arrangement is to avoid the axles bearing the least and the lesser weights being locked and their wheels sliding.

By the present invention we are enabled to utilize the 100 per cent braking effect on the wheel brakes by the suitable adjustment of the associated magnetic brakes. In other words, the rail brakes and the wheel brakes cooperate. For instance, the rail brake when magnetized and when within the magnetic field has a powerful affinity for the rail, and slaps down upon it with great pressure, say 2,000 pounds, according to the area or bulk of the rail brake. This action of the rail brake creates a strong downward pull of the wheels through their connection with the truck body. Such downward pressure on the wheels creates a strong frictional contact between the wheels and the rails. This permits of pressing the wheel brakes against the wheels with a greater force without locking the wheels and causing them to slide on the rail, which latter is prevented by the excessive frictional contact of the wheels with the rail.

These coactions, of course, take place in all four of the rail brakes and in all four of the wheels and wheel brakes, but with greater force by the rear rail brakes and the rear wheels because such rear rail brakes are magnetized by two magnetizing coils; as is more fully stated in the body of this specification.

Referring to the drawing:

Figure 1 illustrates diagrammatically the relationship of the car body, trucks, magnetic brakes and electrical control mechanism.

Figure 2 shows a single truck and the location generally of the magnetic track brake shoes, and the wheel brakes and the conventional mechanism for actuating them; the arrow indicating the direction of movement of the truck, but our invention is adaptable for movement in either direction and the apparatus is so adjusted.

The dotted line shoe indicates the conventional position of the conventional magnetic track brake shoe, which position may or may not be used with this invention: but the full line diagrammatic indications of the magnetic track brake shoes indicate those shoes that are employed in connection with the instant invention.

Each of the outrigger shoes shown in full line in Figure 2 is provided with two or more energizing solenoids whereby the "drag" of each rail shoe may be regulated and the trailing rail shoe may be automatically given the greater "drag".

Referring to the drawings in detail, 1 designates a conventional car body having the trucks 2 and 3 supporting it. These trucks are provided with the usual wheels 4 and truck springs 5 so that the trucks can move vertically with respect to the axle 6 by reason of the guides 7 sliding with respect to the axle 6.

Suspended from the trucks by the springs 8 are the brake shoes 9 and 10. These brake shoes are customarily suspended above the rail at a safe distance therefrom of approximately 2½ to 3 inches and are moved into the magnetic zone adjacent the rail and then magnetized. These are features that do not form a part of our invention but are mentioned so that it will be understood that any conventional form of magnetic brake suspension and application may be employed.

Turning to the specific part of our invention, the pendulum contact member 10a is pivotally supported at 11 on the car to constitute a pendulum switch. It is suspended in a vertical plane longitudinal of the vehicle and so arranged that its weight may make contact with either one of the two contact segments 12 and 13, depending upon the direction in which the vehicle is travelling. The switch contact 10a is connected by a wire 14 to the junction point 15.

The contact member 13 is connected by the wire 16 to an adjustable contact finger 17 engaging the electrical resistance group 18 which is connected by the wire 19 to the solenoid coil 20 which is grounded at 21. This coil is located in one of the shoes such as the shoe 9. The wire 16 is connected to the wire 22 which in turn is connected to a resistor 23 which has the adjustable contact member 24 connected to the wire 25 and thence to the shoe solenoid 26 grounded at 27. This solenoid is in the shoe 9 of the second truck. The contact 12 is connected by the wire 28 to the terminal 29. On one side the terminal 29 is connected to the wire 30 connected to the resistor 31 having an adjustable finger 32 connected to the wire 33 and thence to the magnetic track brake solenoid 34 which is grounded at 35. This solenoid is located in the magnetic track brake shoe 10 of the right hand truck. The wire 36 is connected to the terminal 29 and thence through an adjustable finger 37 to the resistor 38 and thence by the wire 39 to the solenoid 40 grounded at 41 in the left hand truck track brake 10.

The pendulum switch 10a is connected through the wire 14 to the terminal 15 and thence to the wire 42 which is connected to the wire 43 containing the solenoid 44 grounded at 45 also located in the magnetic track brake shoe 10 of the left hand truck. The wire 43 is connected through the wire 46 to solenoid 47 grounded at 48 in the right hand track brake 9 of the left hand truck. This circuit is adapted to be energized by the connection of the wire 42 to a source of electrical energy supplied by the wire 49 from any desired source. The switch member 50 is adapted to close this circuit connecting 42 and 49 as by the application of air to the cylinder 51.

The terminal 15 is connected to the wire 52 and thence through wire 53 to solenoid 54 grounded at 55. This solenoid is in the left hand magnetic track brake shoe 10 of the right hand truck. Likewise the wire 56 connects the solenoid 57 grounded at 58. This solenoid is in the right hand magnetic track brake shoe 9 of the right hand truck.

Thus the right hand track brake shoe of the right hand truck has the solenoids 26 and 57. The left hand track brake shoe 10 of the right hand truck has solenoids 34 and 54. The right hand brake shoe 9 of the left hand truck has the solenoids 20 and 47. The left hand brake shoe 10 of the left hand truck has the solenoids 40 and 44.

Assuming that the trucks and vehicle are moving in the direction of the arrow, the solenoids 26 and 20 will be the solenoids in the leading track brake shoes 9—9 and the solenoids 34 and 40 will be in the trailing magnetic brake shoes 10. Each of these solenoids has the same number of convolutions. Their relative effectiveness can be regulated by adjusting the ohmic resistance of 18 and 23. 20 and 26 are energized when the vehicle is decelerating while travelling to the left hand and solenoids 34 and 40 are energized when the vehicle is decelerating while travelling towards the right hand.

Suitable devices such as dashpots, springs and the like may be employed for regulating the speed of the movement of the pendulum contact 10a.

It will be understod that under some circumstances the trailing shoe only will be energized by the operation of the pendulum or inertia switch. It is the object of the pendulum switch controlling the outrigger magnetic track brakes to accomplish a deceleration at the highest possible rate in emergencies and to adjust for the natural weight transfer heretofore referred to. An instance of an emergency such as referred to is a sudden appearance of imminent danger ahead— such as a broken rail. And an instance of such adjustment relative to the peculiar transfer of weight, according to which direction the train is traveling, is the increased weight on the forward truck, and on the forward axle of each truck, which transfer of weight is, under this invention, accompanied by simultaneously energizing the rear solenoids of each truck, as solenoids 34 and 40. The pendulum switch may be located at any place in the vehicle, the location of it in the center of the vehicle being merely for the purpose of illustration, but it is desirable that it be suspended in a vertical plane longitudinal of the vehicle.

It will be understood that when the rear rail brake 10 at A is energized by both of its coils 40 and 44, also at A, it will be urged more firmly toward the rail than will the forward rail brake 9, at B, with its one energizing coil 26. The excess downward force of the rail brake 10, at A, while creating a braking force which will check the speed of the truck, also creates a downward pull on the truck which is greater than that applied by the forward rail brake at B. In this way, the tendency of the truck to rise at the rear end is overcome by the excessive attraction of the rail brake 10 at A to the rail. These are the factors which are controlled by the organization of the rail brake apparatus of our system.

This explanation is one example of the operation of our brake system. The converse would be true if the vehicle and its train were moving to the left instead of to the right, as in the above example. If it were moving to the left, then the shoe 9 at B would act exactly as would the shoe 10 in the above example, and in that case both coils 26 and 57 in shoe 9, at B, would be energized and the shoe 9 thus magnetized, while the coil 40 alone in the shoe 10 at A would be energized.

We further show, in Figure 2, an arrow (g) representing the direction of the application of the weight of the car, an arrow (h) showing the direction of momentum before the brakes are applied, and an arrow (i) showing the diverted direction or course of a portion of the force of momentum when the brakes are applied, and particularly the action of the rear rail brake. The result of the changed course of the momentum downwardly acts to transfer a substantial portion of the weight which was carried by the horizontal momentum indicated by the arrow (h), downward, which course will effect the downward transfer of a material portion of the weight, and add to the braking action.

Each truck wheel is provided with a wheel brake C sustained by the conventional hangers D and D', interconnected at their lower ends by the conventional rod E. Hangers D' are pivoted at their upper ends to the truck frame, while the hangers D are supplied with the conventional pitman rod F which is actuated by the hand mechanism or by air brake equipment, according to the nature of the installation.

For instance, the rail brake, when magnetized, and when disposed within the magnetic field, has a power affinity for the rail and is clamped thereagainst with great pressure, say, 2,000 pounds, according to the area or bulk of the rail brake. This action of the rail brake creates a strong downward force exerted on the wheels through their connection with the truck body. Such downward pressure of the truck and, therefore, on the wheels, creates a strong frictional contact between the wheels and rails to increase wheel traction. This permits of pressing the wheel brakes against the wheels with a great force without locking the wheels and causing them to slide on the rail, which latter contingency is prevented by the excessive frictional contact of the wheels with the rail.

These coactions, of course, take place in all four pairs of the wheel brakes, but with greater downward force exerted by the rear rail brakes and transmitted to the rear wheels, because the rear rail brakes are magnetized by two magnetizing coils.

It will thus be understood that we have provided a highly efficient and useful braking system for railway cars, the chief components of which system are (a) rail brakes adapted to be magnetized to set up a magnetic track between the brakes and the railway rails; and (b) wheel brakes which coact with the rail brakes in the manner above set forth. The rail brakes A may be variably energized, as above pointed out, to vary the downward force applied thereby to the truck.

It will be understood that the structure shown and above described is merely illustrative of mechanism which may be utilized in practicing the principles of this invention and that the principles of this invention may be applied to rail vehicles of varying types, whether steam, electric, or Diesel electric.

It will be understood that we desire to comprehend within our invention such modifications as may be clearly embraced within the scope of our claims and invention.

Having thus fully described our invention, what we claim as new and desire to secure by Letters Patent, is:

1. In a magnetic track brake system, a magnetic track brake, dual means for energizing said brake, means for normally energizing one of said means, and momentum responsive means depending upon the deceleration of the car to which the brake is attached for energizing the other of said energizing means.

2. In a magnetic track brake system, a magnetic track brake, means for normally energizing said brake, an electrical source of energy, and means controlled by the deceleration of the car to which the brake is attached for further energizing said track brake.

3. In a magnetic track brake system, a car, a truck therefor having wheels, wheel brakes, and axles and including an outrigger track brake shoe mounted on said truck outside of the space between the axles and having multiple coils, means responsive to wheel brake application for energizing one coil of said shoe, and means responsive to the deceleration of the car for energizing another coil of said shoe.

4. In a magnetic track brake system, a car having trucks, wheels and axles, an outrigger magnetic track brake mounted on said truck outside of the space between the axles and adjacent one of the rails, a plurality of energizing means in said track brake, means for connecting one of said energizing means to a source of electrical energy, and means controlled by the deceleration of the car for connecting the other of said energizing means to said source of electrical energy.

5. In a magnetic track brake system, a car having trucks, axles and wheels, magnetic track brakes mounted on either end of said truck outside of the space between the axles, a common interconnected magnetizing system for said brakes, means under the control of an operator for connecting said brake energizing means to a source of electrical energy, and supplementary energizing means for each of said brakes so arranged that the inertia of deceleration of the car will energize at least one of said brake supplementary energizing means.

6. In a magnetic track brake system, a car having trucks, axles and wheels, an outrigger magnetic track brake shoe mounted adjacent a rail on one of said trucks to the rear thereof, means for normally energizing said brake to apply it under the control of the operator, and supplementary means for energizing said brake automatically connected to a source of electrical energy for energization when the deceleration exceeds a predetermined amount.

7. In a magnetic track brake system, a truck supporting a car, an outrigger track brake mounted on the rear of the truck, a plurality of energizing means in said magnetic track brake, means for normally energizing one of said means, and means for normally energizing the other of said means in an emergency.

8. In a magnetic track brake system, a truck supporting a car, an outrigger track brake mounted on the rear of the truck, a plurality of energizing means in said magnetic track brake, means for normally energizing one of said means, means for abnormally energizing the other of said means in an emergency, and means of adjusting the extent of energization of the supplementary energizing means.

9. In combination in a magnetic track brake system of a car having trucks, axles and wheels, outrigger magnetic track brake shoes mounted on the front and rear of each truck, normal energizing means for each of said shoes, means of connecting said energizing means to a source of electrical energy, supplementary energizing means in each of said shoes, and a pendulum switch effected by the inertia of movement of the car adapted to selectively connect the rear supplementary energizing brake shoe means to a source of electrical energy when the deceleration of the car exceeds a predetermined rate.

10. In a method of braking a railway car having a car body and a plurality of wheels and axles on trucks, uniformly distributing downward forces between the truck and the rails by applying a magnetic attraction between the truck and rails on either end of the truck, and adjusting the distribution of downward forces on the wheels and axles of the truck by selectively increasing the magnetic attraction of the truck to the rails at that end of the truck which is the rear end of the truck as determined by the direction of motion of the truck.

11. In a method of braking a railway car having a car body and a plurality of wheels and axles on trucks, uniformly distributing downward forces between the truck and the rails by applying a magnetic attraction between the truck and rails on either end of the truck and equalizing the distribution of downward force on the respective wheels and axles of the truck by selectively increasing the magnetic attraction of the truck to the rails at that end of the truck which is the rear end of the truck as determined by the direction of motion of the truck, and utilizing the deceleration of the truck for initiating application of counterbalancing forces to accomplish equalization of downward forces.

12. In combination, an inertia switch mounted on a car, magnetic track brakes connected thereto and adapted for energization through operation thereof, and independently operable means for connecting said magnetic track brakes with a source of electrical energy.

13. In combination, an inertia switch mounted on a car, magnetic track brakes connected thereto, and independently operable means for connecting said magnetic track brakes through said inertia switch with a source of electrical energy, said magnetic track brakes being mounted on the rear of the car truck to the rear of the rear axle thereof.

14. In combination, a car having trucks, wheels and axles and wheel brakes, magnetic track brakes mounted on the outside of said trucks fore and aft thereof, means for normally energizing said track brakes when the wheel brakes are being applied, and means for abnormally energizing one or more of said brakes for equalizing the load on each wheel and the wheel braking effect thereon.

THEODORE H. SCHOEPF.
DAVID M. RITCHIE.